United States Patent
Calhoun et al.

(10) Patent No.: US 10,615,613 B2
(45) Date of Patent: Apr. 7, 2020

(54) CONTROLLABLE CHARGING SYSTEMS AND METHODS

(71) Applicant: THAMES TECHNOLOGY HOLDINGS, INC., Baltimore, MD (US)

(72) Inventors: Scott A. Calhoun, Baltimore, MD (US); Jay Steinmetz, Baltimore, MD (US)

(73) Assignee: Thames Technology Holdings, Inc., Baltimore, MD (US)

( * ) Notice: Subject to any disclaimer, the term of this patent is extended or adjusted under 35 U.S.C. 154(b) by 94 days.

(21) Appl. No.: 15/807,115

(22) Filed: Nov. 8, 2017

(65) Prior Publication Data

US 2018/0131201 A1    May 10, 2018

Related U.S. Application Data

(60) Provisional application No. 62/419,502, filed on Nov. 9, 2016.

(51) Int. Cl.
| | |
|---|---|
| *H02J 7/00* | (2006.01) |
| *H02J 7/02* | (2016.01) |
| *H02J 50/90* | (2016.01) |
| *H04W 4/38* | (2018.01) |
| *H02J 50/12* | (2016.01) |

(Continued)

(52) U.S. Cl.
CPC .......... *H02J 7/0021* (2013.01); *H02J 7/0027* (2013.01); *H02J 7/025* (2013.01); *H02J 50/12* (2016.02); *H02J 50/80* (2016.02); *H02J 50/90* (2016.02); *H04W 4/38* (2018.02); *H02J 7/35* (2013.01); *H04W 4/80* (2018.02); *H04W 8/005* (2013.01)

(58) Field of Classification Search
USPC ........................................................ 320/108
See application file for complete search history.

(56) References Cited

U.S. PATENT DOCUMENTS

| | | | | |
|---|---|---|---|---|
| 7,639,514 B2 * | 12/2009 | Baarman | ................... | A61L 2/10 363/16 |
| 8,497,601 B2 * | 7/2013 | Hall | ........................ | B60L 53/52 307/104 |

(Continued)

FOREIGN PATENT DOCUMENTS

WO    WO-2006001557 A1 *    1/2006    .............. H02J 7/025

*Primary Examiner* — Samuel Berhanu
(74) *Attorney, Agent, or Firm* — Occhiuti & Rohlicek LLP

(57) ABSTRACT

Disclosed are implementations, including a method that includes obtaining sensor data from at least one sensor in communication with a charging station configured to simultaneously charge multiple chargeable devices using power stored in one or more energy storage devices connected to the charging station, including to simultaneously charge at least one inductive chargeable device, and perform a wired charging operation to charge at least one wired chargeable device. The method further includes determining, based on the sensor data, device information for each of chargeable devices, with the determined device information including, for example, a device type, location information, and/or timing information, and controlling charging operations of the charging station to charge the chargeable devices based, at least in part, on the device information for the each chargeable devices within the charging range of the charging station.

23 Claims, 4 Drawing Sheets

(51) Int. Cl.
  *H02J 50/80* (2016.01)
  *H04W 8/00* (2009.01)
  *H02J 7/35* (2006.01)
  *H04W 4/80* (2018.01)

(56) References Cited

U.S. PATENT DOCUMENTS

| | | | | |
|---|---|---|---|---|
| 2007/0182367 A1* | 8/2007 | Partovi | .................. | H01F 5/003 |
| | | | | 320/108 |
| 2011/0050164 A1* | 3/2011 | Partovi | .................. | H01F 5/003 |
| | | | | 320/108 |
| 2013/0044002 A1* | 2/2013 | Schneider | ........... | H01M 10/441 |
| | | | | 340/636.2 |
| 2014/0285159 A1* | 9/2014 | Wang | .................... | H02J 17/00 |
| | | | | 320/162 |
| 2014/0292270 A1* | 10/2014 | Ichikawa | .................. | B60L 7/14 |
| | | | | 320/108 |
| 2016/0254697 A1* | 9/2016 | Tanaka | .................... | B60M 1/04 |
| | | | | 191/2 |

\* cited by examiner

CONTROLLABLE CHARGING SYSTEMS AND METHODS

CROSS-REFERENCE TO RELATED APPLICATIONS

This application claims the benefit, and priority to, of U.S. Provisional Application No. 62/419,502, entitled "HIGH-TOP CHARGING TABLE," filed Nov. 9, 2016, the content of which is incorporated herein by reference in its entirety.

BACKGROUND

With the proliferation of mobile devices, users rely on their personal mobile device for an ever-larger array of activities, including communication, working, leisure-related activities (reading, watching videos), navigation, and so on. Consequently, such mobile devices are regularly used throughout the day, and thus consume significant amounts of power, which results in generally rapid depletion of the devices' power sources (e.g., rechargeable batteries). Users, therefore, require a convenient way to quickly charge their mobile devices while they are out in public spaces where they cannot easily charge their devices the way they would in the comfort of their private spaces.

SUMMARY

In some variations, a method is provided that includes obtaining sensor data from at least one sensor in communication with a charging station configured to simultaneously charge multiple chargeable devices using power stored in one or more energy storage devices connected to the charging station, including to simultaneously inductively charge at least one inductive chargeable device, and perform a wired charging operation to charge at least one wired chargeable device through a wired connection. The method further includes determining, based on the sensor data, device information for each of one or more chargeable devices within charging range of the charging station, the determined device information for the each of the one or more chargeable devices including one or more of, for example, a device type, location information, and/or timing information, and controlling charging operations of the charging station to charge the one or more chargeable devices based, at least in part, on the device information for the each of the one or more chargeable devices within the charging range of the charging station.

Embodiments of the method may include at least some of the features described in the present disclosure, including one or more of the following features.

Controlling the charging operations may include selecting one or more charging interfaces, from a plurality of available charging interfaces, of the charging station based on the determined device information, and indicating the selected one or more charging interfaces.

The plurality of available charging interfaces may include, for example, a plurality of charging coils configured to wirelessly transfer power to chargeable devices, and a plurality of interface ports to receive charging cables connectable to other chargeable devices. Selecting the one or more charging interfaces may include selecting an available one of the plurality of interface ports for a first chargeable device determined to be configured to have a charging input port, and selecting an available one of the plurality of charging coils for a second chargeable device determined to be configured to be wirelessly charged.

The method may further include determining completion of a charging operation for a first device, from the one or more chargeable devices, charged by the charging station, and providing notification to a user of the first device, in response to the completion of the charging operation, of completion of charging operation.

Providing the notification may include sending a wireless communication message to a second device associated with the user of the first device with data indicating the completion of the charging operation for the first chargeable device. The second device associated with the user of the first device may include a wearable wireless device.

Providing the notification may include providing a visual indication that the charging operation is completed at a location on the charging station near a first location determined for the first device.

Obtaining the sensor data may include obtaining image data using at least one light capture device positioned near the charging station, for a scene corresponding to an area in the vicinity of the charging station through which users access the charging station. Determining the device information based on the sensor data may include identifying from the image data of the scene at least one chargeable device object, corresponding to at least one chargeable device of the one or more chargeable devices, appearing in the image data, and determining an associated device type and location estimate for the identified at least one chargeable device.

Obtaining the sensor data may include obtaining the device information using at least one RF transceiver of the charging station, the at least one RF transceiver configured to transmit wireless communications to wireless devices in the vicinity of the charging station and to receive wireless reply communications from the wireless devices in the vicinity of the wireless station. Determining the device information based on the sensor data may include determining from the received wireless reply communications corresponding device type information and corresponding location estimates for at least some of the wireless devices in the vicinity of the charging station.

Determining the location information for the each of the one or more chargeable devices may include one or more of, for example, sensing location of a chargeable device on a contact-sensing surface of the charging station, and/or determining the location information of the chargeable device based on wireless transmissions from the chargeable device.

Determining the location information of the chargeable device based on the wireless transmissions from the chargeable device may include determining a location estimate of the chargeable device based on one or more of, for example, an RFID transmission from the wireless device, a Bluetooth® transmission from the wireless device, a Bluetooth-Low-Energy® (BLE) transmission from the wireless device, and/or a WLAN transmission.

The method may further include charging the one or more energy storage devices of the charging station through electrical power generated by photovoltaic cells in electrical communication with the charging station.

Controlling the charging operations of the charging station may include measuring charging attributes for the one or more chargeable devices, including measuring for a first chargeable device from the one or more chargeable devices one or more of, for example, charging throughput, charging rate, impedance of a battery of the first chargeable device, and/or capacity of the battery of the first chargeable device.

The method may further include presenting data relating to at least some of the measured charging attributes on a display screen coupled to the charging station.

Controlling the charging operation may further include determining, based at least in part on the measured charging attributes and the device information for the first chargeable device, an optimal location relative to a fixed location of the charging station, the optimal location being associated with an improved performance of the charging operation, and presenting data to guide a user to change a position of the first chargeable device to another location, relative to the fixed location of the charging station, corresponding to the determined optimal location.

Controlling the wireless charging operation may include configuring a charging circuitry of the charging station based on the determined location information for the one or more chargeable devices.

Configuring the charging circuitry of the charging station may include displacing one of a plurality of moveable charging coils to a coil location in the charging station proximate to a determined relative location of a first chargeable device from the one or more chargeable devices.

Configuring the charging circuitry of the charging station may include activating one of a plurality of charging coils deployed in the charging station to cause the wireless charging operation for a first chargeable device.

In some variations, a charging system is provided that includes one or more energy storage devices, at least one inductive coil coupled to the one or more energy storage devices, with the at least one coil configured to inductively charge at least one inductive chargeable device, and at least one wired charging port coupled to the one or more energy storage devices, the at least one charging port configured to charge at least one wired chargeable device. The charging system further includes at least one sensor to obtain sensor data related to one or more chargeable devices within charging range of the charging system, and a controller, coupled to the one or more energy storage devices, the at least one inductive coil, the at least one charging port, and the at least one sensor. The controller is configured to determine, based on the sensor data, device information for each of the one or more chargeable devices, the determined device information for the each of the one or more chargeable devices including one or more of, for example, a device type, location information, and/or timing information, and control charging operations of the charging system to charge the one or more chargeable devices based, at least in part, on the device information for the each of the one or more chargeable devices within the charging range of the charging system.

In some variations, an apparatus is provided that includes means for obtaining sensor data from at least one sensor in communication with a charging station configured to simultaneously charge multiple chargeable devices using power stored in one or more energy storage devices connected to the charging station, including to simultaneously inductively charge at least one inductive chargeable device, and perform a wired charging operation to charge at least one wired chargeable device through a wired connection. The apparatus further includes means for determining, based on the sensor data, device information for each of one or more chargeable devices within charging range of the charging station, the determined device information for the each of the one or more chargeable devices comprising one or more of, for example, a device type, location information, and/or timing information, and means for controlling charging operations of the charging station to charge the one or more chargeable devices based, at least in part, on the device information for the each of the one or more chargeable devices within the charging range of the charging station.

In some variations, non-transitory computer readable media are provided, that are programmed with instructions, executable on a processor, to obtain sensor data from at least one sensor in communication with a charging station configured to simultaneously charge multiple chargeable devices using power stored in one or more energy storage devices connected to the charging station, including to simultaneously inductively charge at least one inductive chargeable device, and perform a wired charging operation to charge at least one wired chargeable device through a wired connection. The instructions further include one or more instruction, executable on the processor, to determine, based on the sensor data, device information for each of one or more chargeable devices within charging range of the charging station, the determined device information for the each of the one or more chargeable devices comprising one or more of, for example, a device type, location information, and/or timing information, and to control charging operations of the charging station to charge the one or more chargeable devices based, at least in part, on the device information for the each of the one or more chargeable devices within the charging range of the charging station.

Embodiments of the charging system, the apparatus, and the computer-readable media may include at least some of the features described in the present disclosure, including at least some of the features described above in relation to the method.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Disclosed herein are methods, systems, devices, media, and other implementations for a multi-device charging system, that includes a charging system comprising one or more power storage devices, e.g., rechargeable batteries that can be charged from an external power supply, or from a power harvester to harvest energy from renewable energy sources such as the sun (via photovoltaic cell), or wind (via local wind turbines). The charging system also includes at least one inductive coil coupled to the one or more power storage devices, with the at least one coil configured to inductively charge at least one inductive chargeable device, and at least one wired charging port coupled to the one or more power storage devices, with the at least one charging port configured to charge at least one wired chargeable device. The charging system additionally includes at least one sensor to obtain sensor data related to one or more chargeable devices within charging range of the charging system (e.g., sensors such as one or more RF transceivers to obtain pertinent information from RF transmissions from chargeable devices within the vicinity of the charging system/station, one or more light-capture devices to obtain visual data relating to charging devices in the vicinity of the system/station). The charging system further includes a controller, operatively coupled to the one or more power storage devices, the at least one inductive coil, the at least one charging port, and the at least one sensor, with the controller configured to determine, based on the sensor data, device information for each of the one or more chargeable devices (the determined device information for the each of the one or more chargeable devices comprising one or more of, for example, a device type information, location information, and/or timing information), and to control charging operations of the charging system to charge the one or more chargeable devices based, at least in part, on the device information for the each of the one or more chargeable devices within the charging range of the portable charging station. Thus, the implementations described herein can determine what devices (e.g., type of devices, and, in some embodiments, their charging capabilities) are in the vicinity of a charging station, and further determine their relative locations (e.g., relative to some fixed position of the charging station) and/or timing information (e.g., in what order or when did the devices approach the charging station), and based on that information determine what resources of the charging system to utilize to efficiently charge the various chargeable devices requiring charging.

Figure 1:
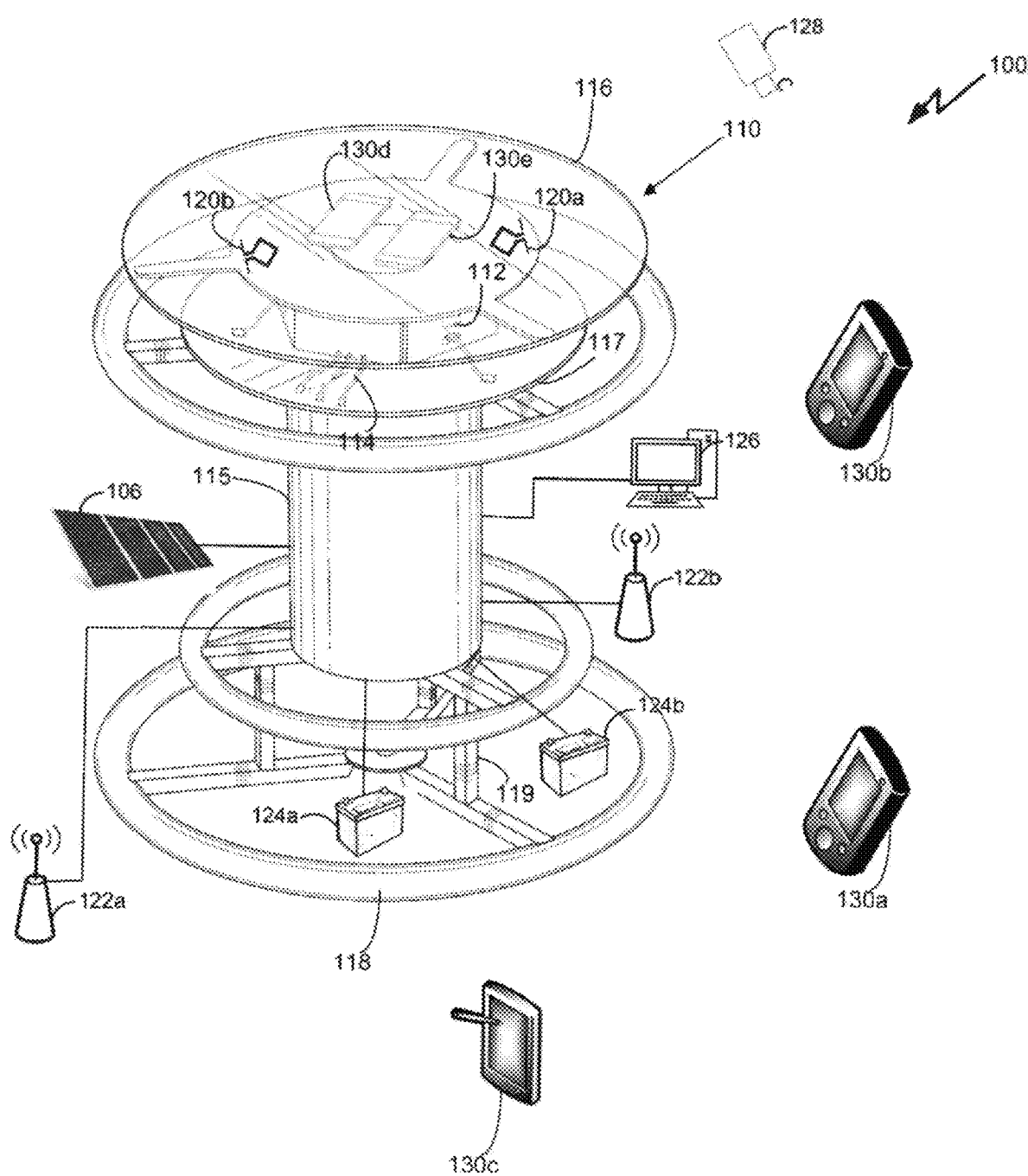
FIG. 1 is a diagram of an example charging system that includes a charging station configured to controllably charge multiple chargeable devices.
Figure 2:
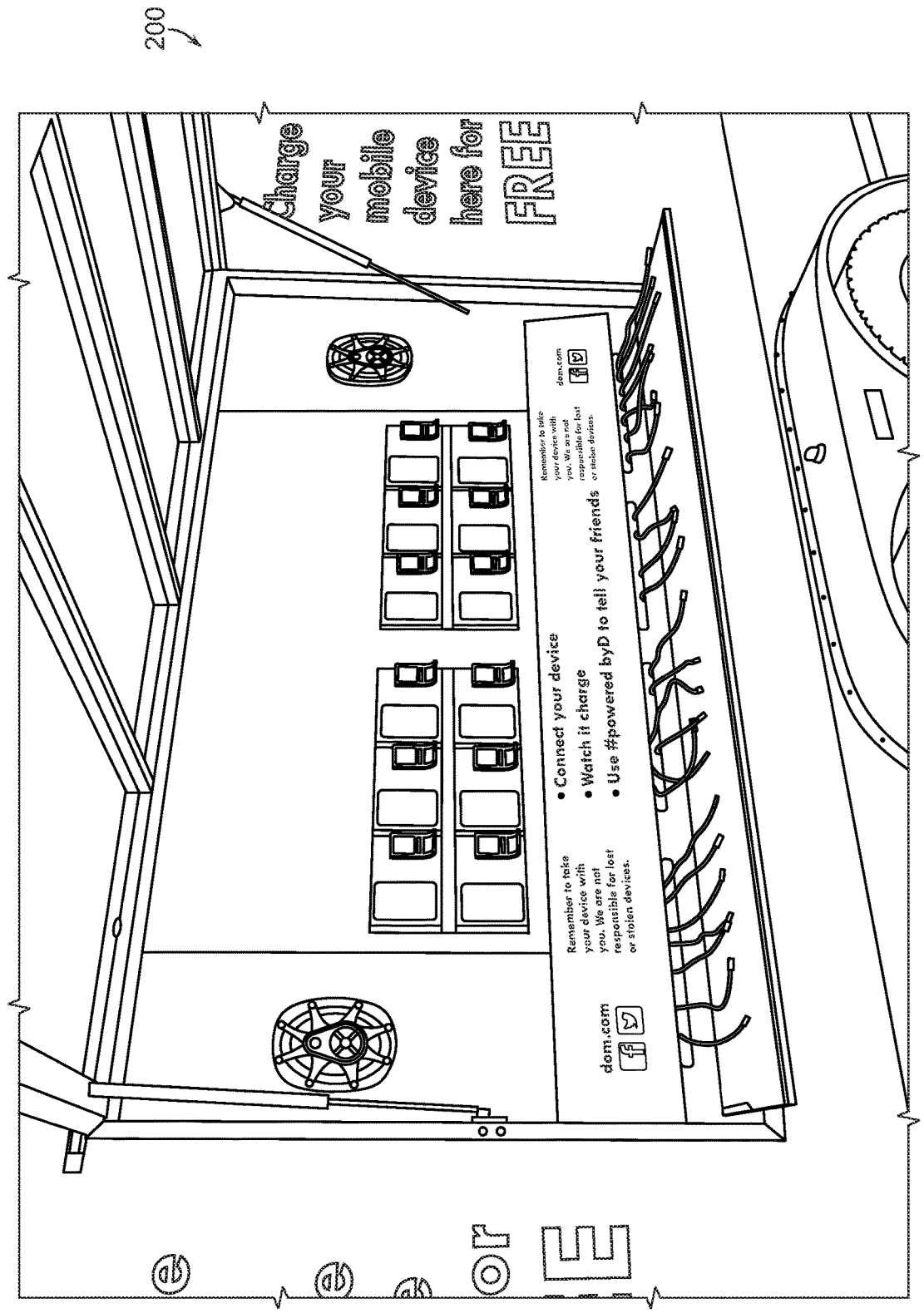
FIG. 2 is an illustration of an example trailer charging station that can be used with the system of FIG. 1.

Thus, with reference to FIG. 1, a diagram of an example charging system 100 that includes a charging station, such as a charging table 110, configured to controllably charge multiple chargeable devices (e.g., mobile devices and other types of personal chargeable devices, such as devices 130a-e in FIG. 1) is shown. The configuration and structure of the charging station may vary and may include any structure configured to allow simultaneous charging of multiple devices, including simultaneous charging through wired connection (e.g., via USB ports) and through wireless interfaces (e.g., inductive power transfer according to established protocols, such as a Qi protocol and/or other protocols). Another example of charging station may be a charging trailer station 200 depicted in FIG. 2.

The charging table 110 illustrated in FIG. 1 may, in some embodiments, weigh approximately 75 lbs., stand 44" high and extend 33" around. The table 110 may offer three (or some other number) standard AC outlets for charging devices that require an actual AC outlet. In some embodiments, the charging table may also include unoccupied, integrated six (6) USB ports (such as the USB port 112) to allow users with their own cable to plug-in, as well as a set of N (e.g., 9) integrated charging cables (such as the cable 114) for different devices. Other combinations of USB ports, AC outlets, or other types of wired ports through which charging operations may be realized, may be used, with such additional ports equipped with cables, or available to receive charging cables provided by the users of the chargeable devices to be charged. In some embodiments, and as will be described in greater detail below, the charging ports may be associated with indicators (e.g., a display, a LED lamp, etc.) to alert a user waiting for an available port that a port has just become available, and/or to indicate that a charging operation has completed (and thus that the user can remove or otherwise take away his/her chargeable device). The notifications may be configured so that a certain emission color or pattern (e.g., green) indicates an available port, or an available space on a surface to place chargeable devices, and use a different emission color or pattern (e.g., flashing red emission to indicate charging operation completion). Alternatively, a port (or area) associated with a particular indicator may be configured to emit the color red to indicate on-going charging, and green to indicate fully charged status. The indicators may, in some implementations, be integrated to charging cable for those charging that are fitted with cables.

A table top 116 of the table 110 may be constructed from a transparent material (such as, for example, acrylic or glass) that helps protect devices, when they are charging, from liquids that possibly may spill. In some embodiments, the center of the table can be an inductive charger and/or video screen. The inductive charger may include one or more indictive coils (such as inductive coils 120a-b, which are depicted in the FIG. 1 even though generally they would be concealed from view) that can each individually interact with a particular chargeable device in the vicinity of the table 110. Such a chargeable device may be laid on spaces available on the table top 116, as is the case with devices 130d-e, or some other areas of the table 110, or may be held, by a user, near the table but without making direct physical contact with any exterior surface of the table (e.g., if the entire surface area of the table 110 is occupied with chargeable devices placed thereon). Although only two inductive coils are depicted in FIG. 1, a charging station such as the charging station 110 may include multiple coils (tens or even hundreds of coils, depending on the dimensions of the charging station, and on the availability of power to use the available coils to charge chargeable devices).

The inductive coils, e.g., the coils 120a-b, may each comprise a coil circuit that may be realized as a power transmitting element (also referred to as an antenna element, or a loop element), and which may be coupled to a tuning circuit (not shown) that is configured to controllably adjust the characteristics of the inductive coil circuit by, for example, modifying its capacitance or inductance (e.g., using an adjustable capacitor). Modification of the characteristics of the inductive coil circuit can be used to controllably adjust the resonant frequency of the inductive coil circuit to thus allow for more optimal matching between a coil of the charging station 110 and a power receiving circuit of a target chargeable device. The chargeable devices with which the inductive coils of the charging station 110 interact may be similarly realized so as to each include an antenna or coil element, which may or may not be coupled to a tuning circuit. The power receiving circuits of target chargeable devices (configured to allow inductive charging operations) may also include an RF-to-DC conversion circuit (e.g., an RF-to-DC rectifier), as well as filtering circuitry to further condition resultant DC power (e.g., through further filtering and/or down-conversion operations to a lower voltage level). The resultant DC power is provided to a storage device (e.g., directly or via some further adaptor or interfacing circuit) realized, for example, using a capacitor(s), a battery(ies), etc. In some variations, the inductive technology used may be implemented based on, for example, a Qi wireless charger PCBA circuit board that allows charging for any Qi-enabled device. To power the technology, a micro USB input may be coupled to the USB charging hub. The Qi wireless technology is high power and quick-acting charging with 75% high-efficient energy conversion. This technology is ultra-thin, lightweight, safe and reliable. Other wireless power transfer technologies may be used. In some variations, the inductive power transfer may also be used to communicate between the devices. For example, inductive power transmissions sent by the transmitting device (e.g., one of the coils of the charging station) may be modulated to encode data that can be decoded, and used, by the receiving device (i.e., in-band communication). Communication between the charging station the chargeable target device may also be implemented via out-of-band signaling.

A controller 126 (e.g., a processor-based controller) coupled to the charging station is configured to manage charging operations, and may, in some embodiments, be configured to control operation (activation and/or position) of the various coils or other interfaces included or deployed with the charging station. For example, based on device information received from chargeable devices, an approximate location of those chargeable devices is determined (location information may have been provided by the chargeable devices using wireless communication links established via the RF transceivers coupled to the charging station, or alternatively, a location estimate can be determined based on signals received at multiple RF transceivers of the charging station). In situations where there the multiple inductive coils of the charging station are stationary, an inductive coil that is optimally situated relative to a target chargeable device may be activated (e.g., an available coil that is closest to the target chargeable device). In situations where the inductive coils are displaceable (e.g., can be moved on tracks using electrical motors, magnets, or some other displacement mechanism), a selected inductive coil may be displaced to the closest location of the target chargeable device.

With continued reference to FIG. 1 the charging table 110 includes a base 118 that can be structured as an open frame. The configuration and/or structure of the table allows for easy serviceability. In some embodiments, located around the center and underneath the top transparent material are three access panels that are secured to the table 110 through various fastening means (e.g., using screws). The access panels can be released and removed by four screws to access/replace cables or view charging stats and have full easy access to the table's components, including power storage devices (e.g., rechargeable batteries that can be charged from external power sources, or via power harvest devices to convert renewable energy sources into stored electrical energy). The transparent material top may also be removable to access components of the table. A tubular structure (e.g., a stem) 115 of the table 110 (such a stem structure may be constructed from aluminum and may be hollow) allows the table 110 to be light, and thus to be easily picked up and moved. The center tube and a hexagon top (where the charging cables, including the cable 114, are located) may be constructed of other material (e.g., steel) to keep the table 110 ridged. For instance, the inner and outer brackets of the table 110 may be made out of, for example, 16-gauge steel and allow access to the charging cables and charging hub circuitry. The exterior structure is configured to have three (3) main sides, to allow, for example, three people (or more) to stand around the table, and to each access three charging cables, a 110 volt AC outlet and two 2.lamp USB ports.

As also illustrated in FIG. 1, the charging table 110 may include a base weld assembly 119 that supports the table with a 2" main tube, 33" wide to support the 44" tall table structure. The base weld assembly 119 may include three feet to level the table and a 1.5" round tube used as a footrest when the table is in use. Other configurations and structures may be used to implement the charging table 110 or another charging station type. The table 110 may be available in different sizes, and structured according to different styles. Branding can be applied to the table to customize the appearance to better suit the event or venue operator.

In some embodiments, the charging table 110 is equipped with one or more energy storage devices, such as the rechargeable batteries 124*a-b* (although two batteries are depicted, any number of batteries, and other types of storage device, including capacitance-based storage devices, may be used). The one or more energy storage devices are configured to power the table (including the controller and user-interfaces) and provide the power that is directed through the charging interfaces to the chargeable devices. The one or more energy storage devices may be configured to hold power sufficient to allow charging operations for some extended period of time (e.g., 16-20 hours, or longer). The use of the storage devices (e.g., internal batteries) allows the charging table to have self-sustaining power for events or venue where direct access to AC outlet is scarce or altogether not practical. In some embodiments, the one or more energy storage devices may include electrochemical cells such as, for example, LiFePO$_4$ (Lithium Iron Phosphate) batteries configured to provide 12.8V 20 AH, 250 Wh at 90 Watt AC output. A universal plug may be used to power the charging table up to 16-20 hrs. The one or more energy storage devices (such as the devices 124*a* and 124*b*) may be periodically charged using an AC power source (an AC outlet, or the output of a generator). In some embodiments, the charging station may be equipped with energy harvesting units to harvest renewable energy (e.g., wind or sun). Thus, for example, the charging station 110 may be coupled to a photovoltaic cell 106 to convert light energy from the sun into electrical power, and/or be coupled to a wind turbine (not shown) to generate electrical power harvested from wind. While the energy storage devices are depicted in FIG. 1 as being outside of the main structure of the charging station 110, in some embodiments, the one or more energy storage devices may be housed within the main structure (e.g., inside the stem structure 115 or the hexagon structure underneath the table top 116).

Some example operational features of the table 110 depicted in FIG. 1 include the following features. Charging hub technology can power LED charging cables. The charging hub technology includes, for example, a twelve port USB charger dock powered by 110 volts (fewer or more USB ports, and/or other types of wired ports, may be used). The charging hub may be limited to output some predetermined total output power (e.g., 100 W). The ports are designed to charge tablets and cell phone devices providing up to 2.4 Amps per port. The output may be 5V and may utilize intelligent USB fast charging IC technology. Such example charging stations may thus have a power rating of 100 W/20 Amps output per charging hub. Safety features include over-heated, over-current, and/or over-charging protection mechanism/circuits. The shell may be made of anti-fire ABS material and built-in aluminum heat dissipation panels.

As noted, another feature that the charging systems and methods described herein may implement is the use of inductive power transfer technology to charge at least some chargeable devices (e.g., simultaneously, or at different time instances, with wired charging via wired interfacing ports). In such embodiments, inductive coils may be distributed at various locations of the table, typically encased or covered by surfaces of the charging station 110. For example, as discussed, and as illustrated in FIG. 1, the coils 120*a-b* may be located within the transparent table top 116 of the charging table 110 (near the center of table 110). Inductive coils may also be deployed within the platform 117 of the charging table 110, and elsewhere in the table 110.

Another feature that may be incorporated into charging stations such as the charging table 110, or the charging trailer 200, may include the use of an outlet technology includes three (3) outlets on three (3) sides of hexagon with two (2) USB ports. Each outlet has a 2-pole system including a ground, copper wiring and two 2.1 Amp USB chargers with tamper resistant receptacle. The two ports are designed to charge tablets/cell phones at 2.1 Amps and a LED indicator configured to notify users that their respective devices are charging. These outlets are durable and with a corrosion-resistant design.

As noted, the charging station (such as the charging table 110 or the charging trailer 200) includes the controller 126 that is configured to control (and optimize) charging operations and power management realized by the charging station. Such a controller, which may be implemented using one or more processor-based devices, may also be configured to collect and/or compute charging statistics and user information for users that have accessed and used the charging station to charge their devices (e.g., with such statistic and information being collected per event or per time period). The charging statistics may also include charging attributes (and metrics computed therefrom) measured by the various charging interfaces of the charging station (e.g., the wired interfaces and/or the wireless interfaces). The controller 126 may thus monitor power activity at the ports and interface (including at the inductive coil interfaces) of the charging station, and count occurrence of charging events, their durations (by recording beginning and end timestamps), power transferred through each interface, etc. In some embodiments, the controller may be configured to deliver statistics, metric, and other such information, once a certain counting threshold has been reached (e.g., 10,000 charging events), or at the completion of some time period/window (e.g., at 11:59 AM of a particular day). Such statistical information may be transmitted to a remote device (a central server in communication with the charging station), and/or may be presented on a user-interface (realized through a LED screen provided with the charging station, a personal device, e.g., iPad® coupled to, or in communication with, the controller of the charging station, etc.) The controller 126 may be integrated into the charging station, and may thus be positioned internally inside an interior space defined in one of the parts comprising the charging station 110, such as the stem 115 of the charging table, the hexagon supporting the table top 116, or elsewhere within an interior space of the charging station. Alternatively, in some embodiments, an external device, such as a computing station, a tablet device, etc., may be coupled to the charging station, and may be configured to perform the controlling operations (processing sensor data, activating charging interfaces, communicating with remote chargeable devices, and so on). The charging station may, in such embodiments, include an adapter or interface (including a wireless interface) to couple the external controller to the circuitry of the charging station.

With further reference to FIG. 1, the system 100 also includes one or more sensors, coupled to the controller 126, to obtain sensor information based on which a determination may be made as to what chargeable devices are within the vicinity of the charging station, including the types of the devices (and thus their chargeable capabilities) that are in the vicinity of the charging station, information about the order at which those devices have approached the charging station (to thus allow implementation of a serving queue if the number of devices requiring charging exceeds the number of charging resources available), and/or location information. For example, the at least one sensor may include one or more light-capture devices such as a camera 128 or some other type of optical sensors, e.g., a charge-couple device (CCD)-type camera, a CMOS-based image sensor, etc., which may produce still or moving images. The light-capture device may be further used to determine an ambient level of illumination and/or information related to colors and existence and levels of UV and/or infra-red illumination. Image data captured by the one or more light-capture devices may be processed to identify mobile devices (e.g., based on their shapes or morphology), including the type of device, which in turn may be used to determine charging capabilities of the device. For example, different devices may have unique morphological features (e.g., surface contours) that can be used to determine the device type and/or the distance to the light-capture device, e.g., if a particular device is determined to be a particular mobile phone model, the dimensions of that mobile phone would be known, and therefore the image dimensions for that device can be used to derive the distance to the light-capture device. In some embodiments, devices may be provided with optical indicators or tags (e.g., barcode tags, QR tags, etc.) that identify the device type (and thus its characteristics and capabilities). The capture images of a barcode or a QR tag can then be processed by the controller to decode the data encoded into such visual codes. Thus, in such embodiments, the at least one light capture device (such as the camera 128) is configured to obtain image data using at least one image capture device positioned near the portable charging station, for a scene corresponding to an area near the charging station through which users access the charging station. The controller 126 is configured to subsequently determine the device information (for a device appearing in the captured image) based on the sensor data, including to identify from the image data of the scene at least one chargeable device object, corresponding to at least one chargeable device of the one or more chargeable devices, appearing in the image data, and determine an associated device type and/or location estimate for the at least one chargeable device.

Another type of a sensor device that may be coupled to the charging station and/or the controller includes an RF communication module (e.g., an RF receiver or a RF transceiver). In the example of FIG. 1, two RF transceiver 122*a* and 122*b* are used to obtain information about chargeable devices in the vicinity of the charging station 110 (e.g., such transmissions may include data representative of device type, device characteristics and capabilities, etc.), as well as to derive distance (range) and/or location information for the locations of the detected devices. For example, the use of multiple RF transceiver (generally deployed at known, or pre-determined, locations relative to the charging station) can be used to derive phase and signal strength information for transmissions sent by a particular wireless device that is to be charged by the charging station, and based on the difference between the phases and amplitudes (as measured by different RF transceivers), an estimate of the location may be obtained. In such embodiments, the controller 126 (or some other computing device that may be situated remotely from the charging station) may be configured to determine from the received wireless communications (transmitted from the various chargeable devices) corresponding device type information and location estimates for at least some of the chargeable devices in the vicinity of the charging station.

Examples of RF transceivers that may be used to obtain device information for at least some chargeable devices in the vicinity of the charging station may include RF transceiver to implement RFID procedures. In such implementations, an RF transceiver (e.g., a UHF transceiver) transmits broadcast transmissions that are detectable by an RFID tag included with a chargeable device coming within range of the RFID transceiver. The RFID tag (which may be an active tag, with its own power supply, or a passive RFID tag which includes a power harvester to harvest power from the RF signals in order to generate and transmit a reply RFID signal), determines whether the received transmission is one it is configured to respond to, and if so, the RFID tag transmits a reply RFID signal (e.g., at the same frequency or at a different frequency than the frequency of the RFID transmission it received from the charging station's RFID device). The reply RFID signal includes an identify of the RFID tag (and thus an identity of the associated device) and/or other device information (device type, device characteristics).

Another example of RF communication module (RF transceiver) that may be used as a sensor of the charging system 100 is a wireless local access network (WLAN) RF transceiver (e.g., WiFi-based RF transceiver) configured to broadcast WLAN beacon signals/frames (which include data pertaining to the transceiver, including the identity of the of the transceiver, e.g., in the SSID, timing information, etc.) detectable by devices coming within range of the WiFi-based transceiver. Upon detecting beacon signals associated with the WLAN router/transceiver, a chargeable device may be configured to establish a communication link with the RF transceiver in order to provide information to allow allocation of charging resources by the charging station to charge that chargeable device. The information provided by the chargeable device, in response to detection of a WLAN beacon frame, may include the chargeable device's charging capabilities (e.g., whether it can be wirelessly charged, or requires a wired charging connection), location information (as may be determined by the chargeable device or one or more RF communication modules at the charging station), and/or other information that may be germane to allocating charging resources to charge the chargeable device.

Yet another example of using an RF transceiver (such as the transceiver's 122a or 122b) as a sensor in order to obtain information about chargeable devices is an RF transceiver implementing short-range protocols such as Bluetooth™ or Bluetooth Low Energy (BLE)™. The RF transceiver may be implemented to send beacons frames (or advertisements, configured according to, for example, the iBeacon protocol). Here too, a particular device (such as any of the devices 130a-e) that may require charging may be configured to detect iBeacon advertisements (or other types of beacons) and to send, in response to the iBeacon advertisements one or more reply transmissions that include device information based on which the charging station (via its controller) can determine the charging processing to be used to charge the particular device (e.g., which charging interface to use, time and order for performing the charging process, etc.) Other communication protocols, including other short-range protocols, and longer-range protocols, may be realized to detect or sense chargeable devices that may require charging by the charging station of the system 100.

Figure 3:
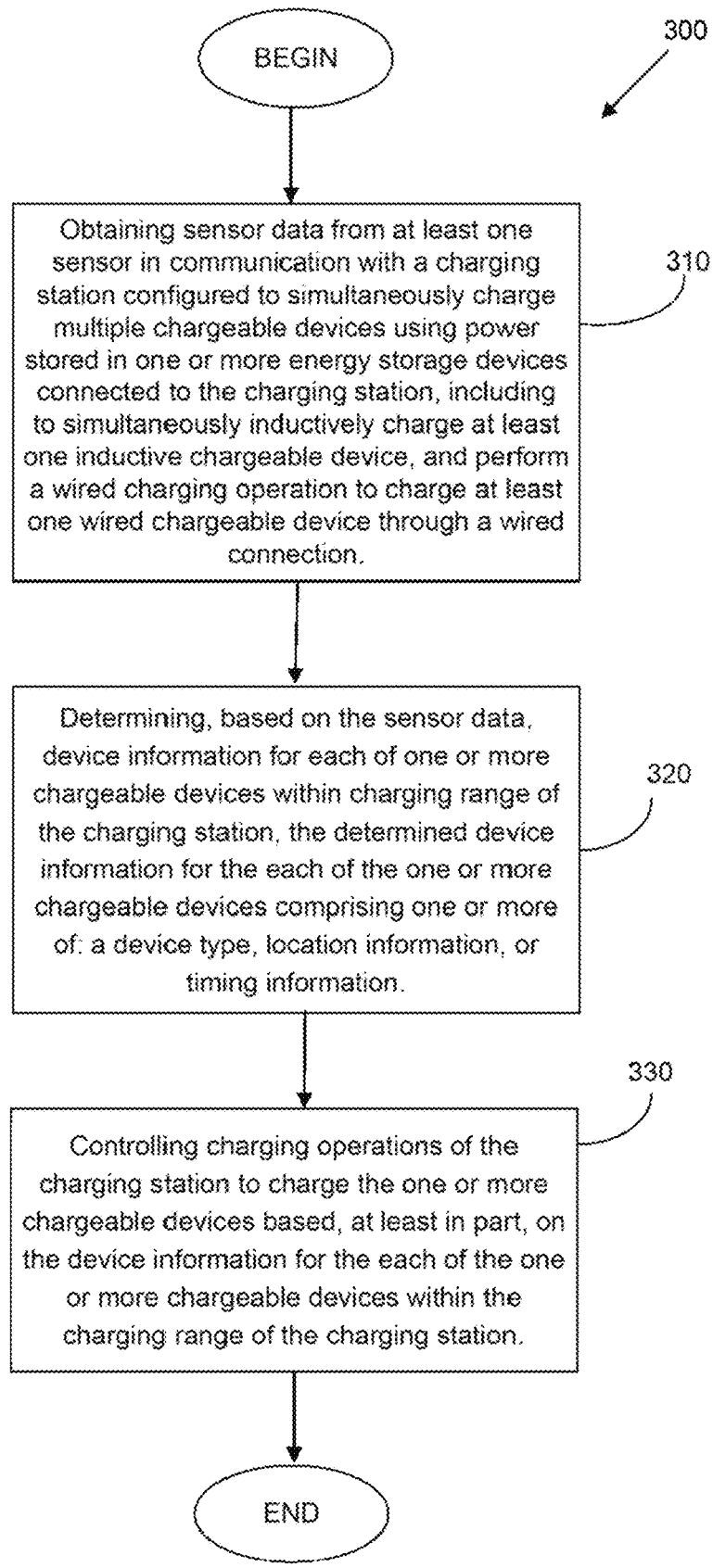
FIG. 3 is a flowchart of an example procedure to control charging operations of a charging station.

With reference now to FIG. 3, a flowchart of an example procedure 300 to control a charging station (such as the charging table 110 of FIG. 1, or the example charging trailer 200 of FIG. 2) is shown. The procedure 300 includes obtaining 310 sensor data from at least one sensor in communication with a charging station (which may be portable) configured to simultaneously charge multiple chargeable devices using power stored in energy storage devices (e.g., the batteries 124a and 124b) connected to the charging station, including to simultaneously inductively charge at least one inductive chargeable device (via an inductive coil, such as the inductive coils 120a or 120b of FIG. 1), and perform a wired charging operation to charge at least one wired chargeable device through a wired connection (e.g., the port 112, or the integrated cable 114 of FIG. 1). As noted, in some embodiments, the at least one sensor may include a camera (or other type of light-capture device) configured to capture image data of a scene that includes the vicinity of the charging station. Captured data can be processed to detect devices approaching the charging station. In such embodiments, obtaining the sensor data may include obtaining image data using at least one image capture device positioned near the charging station, for a scene corresponding to an area near the charging station through which users access the charging station. In addition to detecting chargeable devices appearing in the captured images, more specific information, such as device type/model (and thus the device's charge capabilities) may be determined (e.g., based on detected shapes of the devices, or visible optical codes, such as barcodes or other codes visually displayed on the devices).

In some embodiments, the at least one sensor may include one or more RF communication modules (RF transceivers, including short-range transceivers, such as WLAN access points, RFID transceivers, BLE transceivers, etc.), that are configured to detect chargeable devices in the vicinity of the charging station and/or derive a location estimate for those devices (based on amplitude and phase of signals from the devices detected by the RF communication modules). The RF communication modules and may also be configured to establish communication links with those chargeable device through which information about the chargeable devices may be obtained. The RF communication modules may operate in a passive manner (i.e., detect signals from chargeable devices within range of the RF communication modules), or perform active operations, in which the RF communication modules broadcast beacon signals (e.g., WLAN beacon signal, triggering/interrogating RFID signals, etc.), and wait for responses to those beacons from chargeable devices. The received responses may include device information. Thus, in some embodiments, obtaining the sensor data may include obtaining the device information using at least one RF transceiver of the charging station configured to transmit wireless communications to wireless devices in the vicinity of the portable charging station and to receive wireless reply communications from the wireless devices in the vicinity of the wireless station;

With continued reference to FIG. 3, the procedure 300 further includes determining 320, based on the sensor data, device information for each of one or more chargeable devices within charging range of the portable charging station, with the determined device information for the each of the one or more chargeable devices comprising one or more of, for example, a device type, location information, and/or timing information. Thus, the sensed data (obtained through a camera, one or more RF communication modules, or through some other sensors) can be used to gather information representative of the types of chargeable devices in the vicinity of the charging stations (and therefore, whether a wired or wireless interface would need to be activated to charge the detected chargeable devices), location information for the chargeable devices, and/or timing information (which may be indicative of the order at which chargeable devices approach the charging station, and thus the order and priority at which those devices should be serviced by the charging station). Location information for at least one of the chargeable devices may be derived based, for example, on positioning information computed by (or for) a target chargeable device and transmitted to the charging station via a communication link, based on location information derived using signals detected by RF communication modules, and/or based on image data obtained by the charging station's light-capture device. Other ways to compute a location estimate (which may be relative to some fixed point of the charging station) may be used.

As noted, determining the device information for the each of the one or more chargeable devices may include determining location information for the each of the one or more chargeable devices. In some variations, determining the location information may include one or more of, for example, sensing location of a chargeable device on a touch (contact) sensing surface of the charging station, or determining the relative location of the wireless device based on wireless transmissions from the wireless device received by at least two wireless receivers electrically coupled to the charging station. In the latter case, differences in the amplitude and/or phase of separately detected instances (e.g., detected by the RF communication modules 120a and 120b) of a signal transmitted by a chargeable device, along with location information for those communication module(s), can be used to compute the relative position of the chargeable device (e.g., using multilateration techniques, heatmap based techniques, etc.) Determining the location information of the target chargeable device based on the wireless transmissions from the target chargeable device may include determining a location estimate of the chargeable device based on one or more of, for example, an RFID transmission from the chargeable device, a Bluetooth® transmission from the chargeable device, a Bluetooth-Low-Energy® (BLE) transmission from the chargeable device, and/or a WLAN transmission from the chargeable device. As discussed, location information (including a location estimate) may have been computed by or for the chargeable device (based on signals from satellite vehicles or ground-based network nodes), and transmitted to the RF communication module(s) of the charging station. The transmission of such a location estimate may have been in response to a message sent by the RF communication module (as in the case of an RFID-based system, or a WLAN transceiver that seeks to detect and initiate communication links with wireless devices).

As also shown in FIG. 3, the procedure 300 additionally includes controlling 330 charging operations of the charging station to charge the one or more chargeable devices based, at least in part, on the device information for the each of the one or more chargeable devices within the charging range of the charging station. In some embodiments, controlling the charging operations may include selecting one or more charging interfaces, from a plurality of available charging interfaces, of the charging station based on the determined device information, and indicating the selected one or more charging interfaces. The plurality of available charging interfaces may include a plurality of charging coils (such as the coils 120a and 120b) configured to wirelessly transfer power to chargeable devices, and a plurality of interface ports to receive charging cables connectable to other chargeable devices. Selecting the one or more charging interfaces may include, in such embodiments, selecting an available one of the plurality of interface ports for a first chargeable device determined to be configured to have a charging input port, and selecting an available one of the plurality of charging coils for a second chargeable device determined to be configured to be wirelessly chargeable. For example, the sensed information (be it image data, detected signal characteristics, actual message data sent by the chargeable devices, and so on) can be used to determine the device type or model for various devices in the vicinity of the charging station, and can therefore be used to determine the charging capabilities of the devices (e.g., whether they can be charged through inductive charging techniques, wired charging techniques, or both). Having determined the device types for various detectable chargeable devices within the vicinity of the charging station, the charging interfaces can be assigned to the chargeable devices (e.g., assigning some of the wired interfaces to devices that can only be charged through a wired connection, and assigning coils to chargeable devices that can only be charged inductively). Where a device is determined to be of a type that can be charged either through a wired connection or an inductive wireless connection, in some variations, a wired interface (if one is still available) may be assigned to such a device if the power transfer efficiency is greater using that charging methodology.

In some implementations, controlling the charging operations of the charging station may include measuring charging attributes for the one or more chargeable devices, including measuring for a first chargeable device one or more of, for example, charging throughput, charging rate, impedance of a battery of the first chargeable device, or capacity of the battery of the first chargeable device. The charging attributes can be derive based on measurements performed at the various interfaces (e.g., the coils or the wired connectors) that are representative of the power or charge being transferred to the target chargeable devices in communication with those interfaces, and also based on measurements (of electrical properties) performed on the energy storage devices at the chargeable devices. The measured attributes can be used to improve or optimize the charging operations of the charging device by, for example, identifying more optimal interface/chargeable device pairings, and making appropriate changes to the charging operations (e.g., matching a device being charged through a first coil interface to a second, more optimal, coil interface). The optimization can be performed using various optimization processes (e.g., optimizing using cost functions, optimizing using error functions according to some defined objectives or criteria, etc.) Based on the optimization, the controller of the charging station (such as the controller 126 of FIG. 1) can either pair inductive coils with various chargeable devices that can be charged wirelessly, or, where a user's intervention is required to effect a wired connection or to move a wirelessly chargeable device to a different location (closer to some particular coil), guiding data (LED indicators associated with respective wired interfaces, or text/graphical notifications on a user interface) may be presented to prompt the user to make the necessary changes (e.g., connect a chargeable device to the appropriate wired interface). The user interface on which such guiding data is presented may include a screen connected to the charging station, or a screen on the user's personal device, which may be the screen of the chargeable device, or a screen of a second wireless device, such as a wearable device (e.g., an iWatch™). Thus, in such embodiments, controlling the charging operation may further include determining, based at least in part on the measured charging attributes and the device information for the first chargeable device, an optimal location (e.g., relative to a fixed location of the charging station), with the optimal location being associated with an improved performance of the charging operation, and presenting data to guide a user to change a position of the first chargeable device to another location corresponding to the determined optimal location.

In some variations, controlling the wireless charging operation may include configuring a charging circuitry of the charging station based on the determined relative locations of the one or more chargeable devices. For example, selected ones of a plurality of inductive coils may be activated based on the determined locations of chargeable devices that are to be wirelessly charged. Thus, in such embodiments, configuring the charging circuitry of the portable charging station may include activating one of a plurality of charging coils deployed in the charging station to cause the wireless charging operation for a first chargeable device. Alternatively or additionally, in embodiments in which the inductive coil circuitry is displaceable, controlling the charging circuitry may include displacing one of a plurality of moveable charging coils to a coil location in the charging station proximate to a determined relative location of a first chargeable device from the one or more chargeable devices.

In some embodiments, the charging systems, methods, and other implementations described herein may be configured to monitor the progress of the charging operations (e.g., by receiving information from the chargeable devices indicating completion of the charging operations, by monitoring the charging rate from the various charging interfaces, etc.) Upon determination that charging operation for a particular chargeable device has been completed, notification is provided, e.g., through a LED indicator associated with a particular charging interface, through text or graphical notification to a user interface associated with the charging station or the particular chargeable device, etc. Accordingly, the procedure 300 may further include determining completion of charging operation for a first device, from the one or more chargeable devices, charged by the charging station, and providing notification, in response to the completion of the charging operation, to the user of the chargeable device being charged by the charging station of completion of charging operation. Providing the notification may include, in some variations, sending a wireless communication message to a second device associated with the user of the first device with data indicating the completion of the charging operation for the first chargeable device. The second device associated with the user of the first device may include a wearable wireless device (e.g., an iWatch™). Providing the notification may include, in some embodiments, providing a visual indication that the charging operation is completed at a location on the charging station near a first location determined for the first device.

As noted, the charging station for which the procedure 300 may be implemented, includes the one or more energy storage devices, which may include devices such as the rechargeable batteries 124a and 124b. The one or more energy storage devices may be housed within a hollow structure comprising the charging station, such as the stem 115 of FIG. 1, or may be placed externally to the main structure of the charging station. As further noted, the one or more energy storage devices may be recharged using an external AC source, or via a renewable energy source harvesting unit, such as solar panels, wind turbines, etc. Thus, in some embodiments, the procedure 300 may further include charging the one or more energy storage devices of the charging station through electrical power generated by photovoltaic cells in electrical communication with the charging station.

Figure 4:
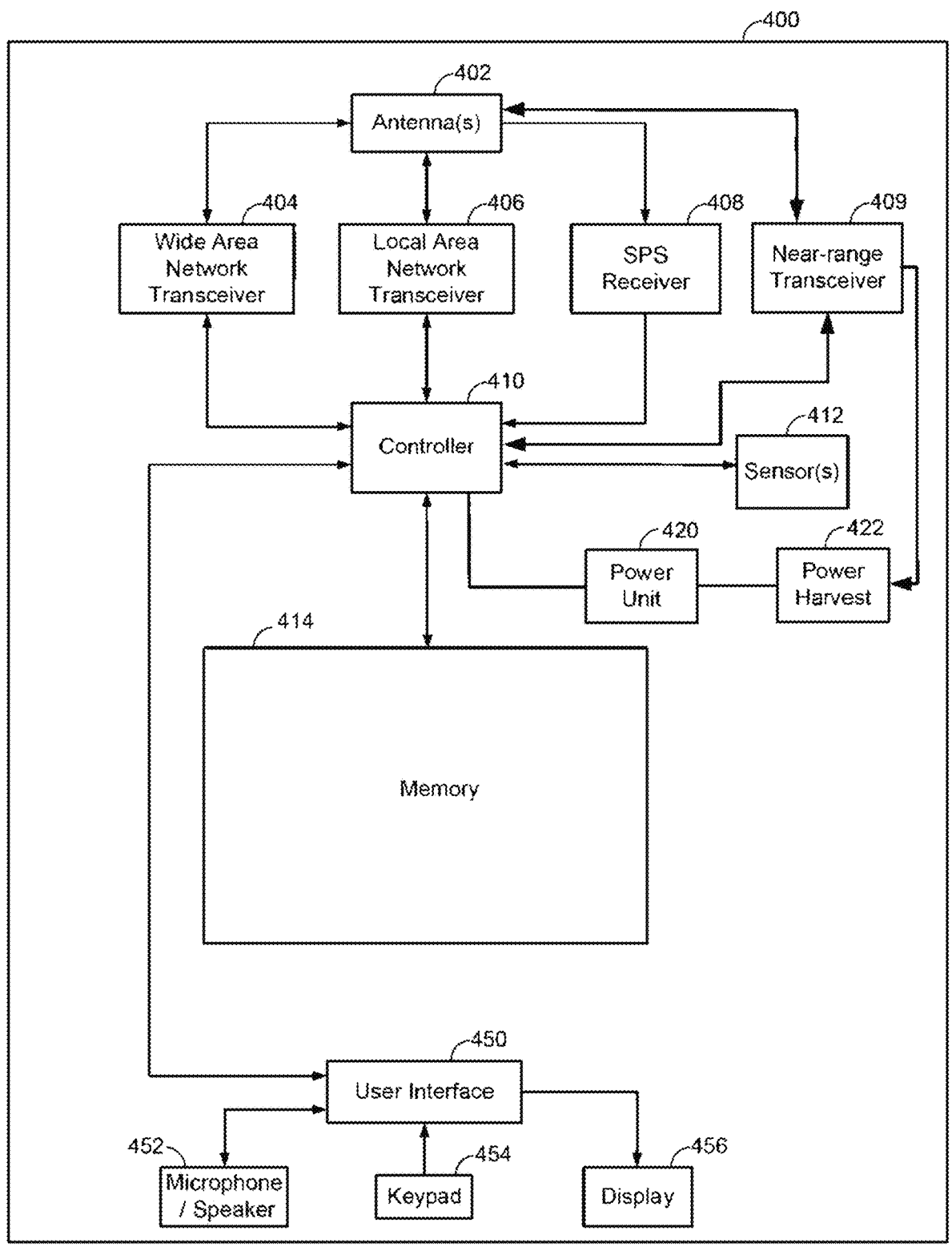
FIG. 4 is a schematic diagram of an example device which may be used in the implementation of any of the devices of FIG. 1.

With reference now to FIG. 4, a schematic diagram of an example device 400, which may be used to implement, at least in part, the circuitry and/or functionality of the charging station 110, the controller 126, the RF transceivers 122a-b, and/or any of the devices 130a-f depicted in FIG. 1, is shown. It is to be noted that one or more of the modules and/or functions illustrated in the example of FIG. 4 may be further subdivided, or two or more of the modules or functions illustrated in FIG. 4 may be combined. Additionally, one or more of the modules or functions illustrated in FIG. 4 may be excluded.

As shown, the example device 400 may include one or more transceivers (e.g., a WWAN transceiver 404, a WLAN transceiver 406, a near-range transceiver 409, etc.) that may be connected to one or more antennas 402. Generally, WLAN or WWAN transceivers may be implemented for devices that require wireless communication functionality over medium to long range distances. The transceivers 404, and 406, and/or 409 may comprise suitable devices, hardware, and/or software for communicating with and/or detecting signals to/from a network or remote devices, and/or directly with other wireless devices within a network. In some embodiments, by way of example only, the transceiver 406 may support wireless LAN communication (e.g., WLAN, such as WiFi-based communications) to thus cause the device 400 to be part of a WLAN implemented as an IEEE 802.11x network. In some embodiments, the transceiver 404 may support the device 400 to communicate with one or more cellular access points (also referred to as a base station) used in implementations of Wide Area Network Wireless Access Points (WAN-WAP), which may be used for wireless voice and/or data communication. A wireless wide area network (WWAN) may be part of a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards, and a TDMA network may implement Global System for Mobile Communications (GSM), Digital Advanced Mobile Phone System (D-AMPS), or some other RAT. In some embodiments, 4G networks, 5G networks, Long Term Evolution ("LTE") networks, Advanced LTE networks, Ultra Mobile Broadband (UMB) networks, and all other types of cellular and/or wireless communications networks may also be implemented and used with the systems, methods, and other implementations described herein.

As noted, the device 400 may also include a near-range transceiver (interface) 409 configured to allow the device 400 to receive and transmit, for example, UHF signals (e.g., in order to effectuate an RFID protocol) or to communicate according to one or more near-range communication protocols, such as, for example, Ultra Wide Band, ZigBee, wireless USB, Bluetooth (classical Bluetooth), Bluetooth Low Energy (BLE) protocol, etc.

As further illustrated in FIG. 4, in some embodiments, an SPS receiver 408 may also be included in the device 400. The SPS receiver 408 may be connected to the one or more antennas 402 for receiving satellite signals. The SPS receiver 408 may comprise any suitable hardware and/or software for receiving and processing SPS signals. The SPS receiver 408 may request information as appropriate from the other systems, and may perform the computations necessary to determine the device's 400 position using, in part, measurements obtained by any suitable SPS procedure. Such positioning information may be used, for example, to determine the location and motion of an RFID device. Additionally or alternatively, the device 400 may derive positioning information based on signals communicated to and from access points (and/or base stations), e.g., by performing multilateration position determination procedures based on metrics derived from the communicated signals. Such metrics from which the device 400's position may be determined include, for example, timing measurements (using techniques based on round trip time, or RTT, measurements, observed-time-difference-of-arrival, or OTDOA, in which a receiving device measures time differences in received signals from a plurality of network nodes, and so on), signal-strength measurements (e.g., received signal strength indication, or RSSI, measurements, which provide a representation of signal power level of a signal received by an antenna of the receiving device), etc.

In some embodiments, one or more sensors 412 may be coupled to a controller/processor 410 to provide data that includes relative movement and/or orientation information which is independent of motion data derived from signals received by, for example, the transceivers 404, 406, and/or 409, and the SPS receiver 408. By way of example but not limitation, sensors 412 may utilize an accelerometer (e.g., a MEMS device), a gyroscope, a geomagnetic sensor (e.g., a compass), and/or any other type of sensor. Moreover, sensor 412 may include a plurality of different types of devices and combine their outputs in order to provide motion information. The one or more sensors 412 may further include an altimeter (e.g., a barometric pressure altimeter), a thermometer (e.g., a thermistor), an audio sensor (e.g., a microphone), a camera or some other type of optical sensors (e.g., a charge-couple device (CCD)-type camera, a CMOS-based image sensor, etc., which may produce still or moving images that may be displayed on a user interface device, and that may be further used to determine an ambient level of illumination and/or information related to colors and existence and levels of UV and/or infra-red illumination), and/or other types of sensors.

With continued reference to FIG. 4, the device 400 may include a power unit 420 such as a battery and/or a power conversion module that receives and regulates power from an outside source (e.g., AC power). In situations in which the device 400 may not have readily available access to replaceable power (e.g., batteries) or AC power, the power source 420 may be connected to a power harvest unit 422. The power harvest unit 422 may be configured to receive RF communications, and harvest the energy of the received electromagnetic transmissions (although FIG. 4 illustrates the unit 422 receiving RF communication via the near-range interface 409, the power harvest unit 422 may be connected to, and receive RF energy from, any of the other communication interfaces depicted in FIG. 4). As noted, an RF harvest unit generally includes an antenna element coupled to an RF-to-DC conversion circuit (e.g., an RF-to-DC rectifier). Resultant DC current may be further conditioned (e.g., through further filtering and/or down-conversion operation to a lower voltage level), and provided to an energy storage device realized, for example, on the power unit 420 (e.g., capacitor(s), a battery, etc.)

The controller 410 may be connected to the transceivers 404, 406, 409, the SPS receiver 408, the sensors 412, and the power unit 420. The controller may include one or more microprocessors, microcontrollers, digital signal processors, special purpose logic circuitry (e.g., an FPGA (field programmable gate array), an ASIC (application-specific integrated circuit), etc.) that provide processing functions, as well as other calculation and control functionality. The processor 410 may also include memory 414 for storing data and software instructions for executing programmed functionality within the device. The functionality implemented via software may depend on the particular device at which the memory 414 is housed, and the particular configuration of the device and/or the devices with which it is to communicate. For example, if the device 400 is used to a controller to control charging operations of a charging station, the device may be configured (via software modules/applications provided on the memory 414) to implement processes similar to the processes discussed in relation to FIG. 3.

The example device 400 may further include a user interface 450 which provides any suitable interface systems, such as a microphone/speaker 452, keypad 454, and display 456 that allows user interaction with the mobile device 400. Such a user interface may be an audiovisual interface (e.g., a display and speakers) of a controller (such as the controller 126) or of personal device such as any of the devices 130*a-e* of FIG. 1, or some other type of interface (visual-only, audio-only, tactile, etc.), configured to provide status data, alert data, indications and notification regarding charging operations (e.g., to identify a particular charging interface to use, to inform of completion of a charging operation, and so on). The microphone/speaker 452 provides for voice communication functionality, the keypad 454 includes suitable buttons for user input, the display 456 includes any suitable display, such as, for example, a backlit LCD display, and may further include a touch screen display for additional user input modes. In some embodiments, the display 456 may be a bi-state display configured to maintain (i.e., without requiring on-going supply of energy) the display of particular data (e.g., characters and/or graphics) until the state (i.e., the data) for the bi-state display is changed/updated again. Further details regarding use of a bi-state display for some implementations of the device 400 are provided, for example, in U.S. Pat. No. 8,616,457, entitled "RFID display label for battery packs," the content of which is incorporated herein by reference in its entirety. The microphone/speaker 452 may also include or be coupled to a speech synthesizer (e.g., a text-to-speech module) that can convert text data to audio speech so that the user can receive audio notifications. Such a speech synthesizer may be a separate module, or may be integrally coupled to the microphone/speaker 452 or to the controller 410 of the device of FIG. 4.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
    obtaining sensor data from at least one sensor in communication with a charging station configured to simultaneously charge multiple chargeable devices using power stored in one or more energy storage devices connected to the charging station, including to simultaneously inductively charge at least one inductive chargeable device, and perform a wired charging operation to charge at least one wired chargeable device through a wired connection;
    determining, based on the sensor data, device information for each of one or more chargeable devices within charging range of the charging station, the determined device information for the each of the one or more chargeable devices comprising one or more of: a device type, location information, or timing information; and
    controlling charging operations of the charging station to charge the one or more chargeable devices based, at least in part, on the device information for the each of the one or more chargeable devices within the charging range of the charging station, wherein controlling the charging operations comprises:
        selecting one or more charging interfaces, from a plurality of available charging interfaces, of the charging station based on the determined device information, wherein the plurality of available charging interfaces comprises: a plurality of charging coils configured to wirelessly transfer power to chargeable devices, and a plurality of interface ports to receive charging cables connectable to other chargeable devices, wherein selecting the one or more charging interfaces comprises:
            selecting an available one of the plurality of interface ports for a first chargeable device determined to be configured to have a charging input port, and
            selecting an available one of the plurality of charging coils for a second chargeable device determined to be configured to be wirelessly charged; and
        indicating the selected one or more charging interfaces.

2. The method of claim 1, further comprising:
    determining completion of a charging operation for a first device, from the one or more chargeable devices, charged by the charging station; and
    providing notification to a user of the first device, in response to the completion of the charging operation, of completion of charging operation.

3. The method of claim 2, wherein providing the notification comprises:
    sending a wireless communication message to a second device associated with the user of the first device with data indicating the completion of the charging operation for the first chargeable device.

4. The method of claim 3, wherein the second device associated with the user of the first device comprises a wearable wireless device.

5. The method of claim 2, wherein providing the notification comprises:
    providing a visual indication that the charging operation is completed at a location on the charging station near a first location determined for the first device.

6. The method of claim 1, wherein obtaining the sensor data comprises:
    obtaining image data using at least one light capture device positioned near the charging station, for a scene corresponding to an area in the vicinity of the charging station through which users access the charging station;
    and wherein determining the device information based on the sensor data comprises identifying from the image data of the scene at least one chargeable device object, corresponding to at least one chargeable device of the one or more chargeable devices, appearing in the image data, and determining an associated device type and location estimate for the identified at least one chargeable device.

7. The method of claim 1, wherein obtaining the sensor data comprises:
    obtaining the device information using at least one RF transceiver of the charging station, the at least one RF transceiver configured to transmit wireless communications to wireless devices in the vicinity of the charging station and to receive wireless reply communications from the wireless devices in the vicinity of the wireless station;
    and wherein determining the device information based on the sensor data comprises determining from the received wireless reply communications corresponding device type information and corresponding location estimates for at least some of the wireless devices in the vicinity of the charging station.

8. The method of claim 1, wherein determining the location information for the each of the one or more chargeable devices comprises one or more of:
    sensing location of a chargeable device on a contact-sensing surface of the charging station; or
    determining the location information of the chargeable device based on wireless transmissions from the chargeable device.

9. The method of claim 8, wherein determining the location information of the chargeable device based on the wireless transmissions from the chargeable device comprises:
    determining a location estimate of the chargeable device based on one or more of: an RFID transmission from the wireless device, a Bluetooth® transmission from the wireless device, a Bluetooth-Low-Energy® (BLE) transmission from the wireless device, or a WLAN transmission.

10. The method of claim 1, further comprising:
charging the one or more energy storage devices of the charging station through electrical power generated by photovoltaic cells in electrical communication with the charging station.

11. The method of claim 1, wherein controlling the charging operations of the charging station comprises:
measuring charging attributes for the one or more chargeable devices, including measuring for a first chargeable device from the one or more chargeable devices one or more of: charging throughput, charging rate, impedance of a battery of the first chargeable device, or capacity of the battery of the first chargeable device.

12. The method of claim 11, further comprising:
presenting data relating to at least some of the measured charging attributes on a display screen coupled to the charging station.

13. The method of claim 11, wherein controlling the charging operation further comprises:
determining, based at least in part on the measured charging attributes and the device information for the first chargeable device, an optimal location relative to a fixed location of the charging station, the optimal location being associated with an improved performance of the charging operation; and
presenting data to guide a user to change a position of the first chargeable device to another location, relative to the fixed location of the charging station, corresponding to the determined optimal location.

14. The method of claim 1, wherein controlling the wireless charging operation comprises:
configuring a charging circuitry of the charging station based on the determined location information for the one or more chargeable devices.

15. The method of claim 14, wherein configuring the charging circuitry of the charging station comprises:
displacing one of a plurality of moveable charging coils to a coil location in the charging station proximate to a determined relative location of a first chargeable device from the one or more chargeable devices.

16. The method of claim 14, wherein configuring the charging circuitry of the charging station comprises:
activating one of a plurality of charging coils deployed in the charging station to cause the wireless charging operation for a first chargeable device.

17. A charging system comprising:
one or more energy storage devices;
at least one inductive coil coupled to the one or more energy storage devices, the at least one coil configured to inductively charge at least one inductive chargeable device;
at least one wired charging port coupled to the one or more energy storage devices, the at least one charging port configured to charge at least one wired chargeable device;
at least one sensor to obtain sensor data related to one or more chargeable devices within charging range of the charging system; and
a controller, coupled to the one or more energy storage devices, the at least one inductive coil, the at least one charging port, and the at least one sensor, the controller configured to:
determine, based on the sensor data, device information for each of the one or more chargeable devices, the determined device information for the each of the one or more chargeable devices comprising one or more of: a device type, location information, or timing information; and
control charging operations of the charging system to charge the one or more chargeable devices based, at least in part, on the device information for the each of the one or more chargeable devices within the charging range of the charging system, wherein the controller configured to control the charging operations is configured to:
select one or more charging interfaces of the charging station, from a plurality of available charging interfaces comprising the at least one charging coil and the at least one wired charging port based on the determined device information, including to:
select an available one of the at least one wired charging port for a first chargeable device determined to be configured to have a charging input port; and
select an available one of the at least one charging coil for a second chargeable device determined to be configured to be wirelessly charged; and
indicate the selected one or more charging interfaces.

18. The charging system of claim 17, wherein the at least one sensor comprises at least one light capture device, positioned near the charging system, configured to obtain image data for a scene corresponding to an area in the vicinity of the charging system through which users access the charging system;
and wherein the controller configured to determine the device information is configured to identify from the image data of the scene at least one chargeable device object, corresponding to at least one chargeable device of the one or more chargeable devices, appearing in the image data, and determine an associated device type and location estimate for the identified at least one chargeable device.

19. The charging system of claim 17, wherein the at least one sensor comprises at least one RF transceiver configured to transmit wireless communications to wireless devices in the vicinity of the charging station and to receive wireless reply communications from the wireless devices in the vicinity of the wireless station;
and wherein the controller configured to determine the device information is configured to determine from the received wireless reply communications corresponding device type information and corresponding location estimates for at least some of the wireless devices in the vicinity of the charging station.

20. The charging system of claim 17, wherein the controller configured to control the charging operations of the charging system is configured to:
measure charging attributes for the one or more chargeable devices, including to measure for a first chargeable device from the one or more chargeable devices one or more of: charging throughput, charging rate, impedance of a battery of the first chargeable device, or capacity of the battery of the first chargeable device;
determine, based at least in part on the measured charging attributes and the device information for the first chargeable device, an optimal location relative to a fixed location of the charging system, the optimal location being associated with an improved performance of the charging operation; and
present data to guide a user to change a position of the first chargeable device to another location, relative to the fixed location of the charging system, corresponding to the determined optimal location.

21. A method comprising:
- obtaining sensor data from at least one sensor in communication with a charging station configured to simultaneously charge multiple chargeable devices using power stored in one or more energy storage devices connected to the charging station, including to simultaneously inductively charge at least one inductive chargeable device, and perform a wired charging operation to charge at least one wired chargeable device through a wired connection;
- determining, based on the sensor data, device information for each of one or more chargeable devices within charging range of the charging station, the determined device information for the each of the one or more chargeable devices comprising one or more of: a device type, location information, or timing information;
- controlling charging operations of the charging station to charge the one or more chargeable devices based, at least in part, on the device information for the each of the one or more chargeable devices within the charging range of the charging station;
- determining completion of a charging operation for a first device, from the one or more chargeable devices, charged by the charging station; and
- providing notification to a user of the first device, in response to the completion of the charging operation, of completion of charging operation, wherein providing the notification comprises sending a wireless communication message to a second device associated with the user of the first device with data indicating the completion of the charging operation for the first chargeable device.

22. The method of claim 21, wherein controlling the charging operations comprises:
- selecting one or more charging interfaces, from a plurality of available charging interfaces, of the charging station based on the determined device information; and
- indicating the selected one or more charging interfaces.

23. The method of claim 21, wherein obtaining the sensor data comprises one or more of: obtaining image data using at least one light capture device positioned near the charging station, for a scene corresponding to an area in the vicinity of the charging station through which users access the charging station, or obtaining the device information using at least one RF transceiver of the charging station, the at least one RF transceiver configured to transmit wireless communications to wireless devices in the vicinity of the charging station and to receive wireless reply communications from the wireless devices in the vicinity of the wireless station;
and wherein determining the device information based on the sensor data comprises one or more of: identifying from the image data of the scene at least one chargeable device object, corresponding to at least one chargeable device of the one or more chargeable devices, appearing in the image data, and determining an associated device type and location estimate for the identified at least one chargeable device, or determining from the received wireless reply communications corresponding device type information and corresponding location estimates for at least some of the wireless devices in the vicinity of the charging station.

* * * * *